(12) United States Patent
Daniels, Jr.

(10) Patent No.: US 11,696,662 B1
(45) Date of Patent: Jul. 11, 2023

(54) PRE-MOISTENED CLOTH

(71) Applicant: Ken L. Daniels, Jr., Grand Rapids, MI (US)

(72) Inventor: Ken L. Daniels, Jr., Grand Rapids, MI (US)

( * ) Notice: Subject to any disclaimer, the term of this patent is extended or adjusted under 35 U.S.C. 154(b) by 231 days.

(21) Appl. No.: 16/930,805

(22) Filed: Jul. 16, 2020

(51) Int. Cl.
*A47K 10/02* (2006.01)
*F16B 1/00* (2006.01)
*A47L 13/16* (2006.01)

(52) U.S. Cl.
CPC .............. *A47K 10/02* (2013.01); *F16B 1/00* (2013.01); *A47L 13/16* (2013.01); *F16B 2001/0028* (2013.01)

(58) Field of Classification Search
CPC ... A47K 10/02; F16B 1/00; A47L 13/16; F16B 2001/0028; A42B 1/0182; A42B 1/247; G02C 3/02; A47K 7/02
See application file for complete search history.

(56) References Cited

U.S. PATENT DOCUMENTS

| | | | |
|---|---|---|---|
| 4,749,080 A | 6/1988 | Toohey | |
| 4,753,844 A | 6/1988 | Jones et al. | |
| 4,786,080 A * | 11/1988 | Jay | B60R 22/14 280/808 |
| 4,953,999 A * | 9/1990 | Rivers | A47L 13/17 401/139 |
| 5,629,081 A | 5/1997 | Richards et al. | |
| 6,316,847 B1 * | 11/2001 | Crockett | A63B 63/083 248/326 |
| 6,858,281 B2 * | 2/2005 | Kim | A47K 10/02 15/118 |
| 8,080,489 B2 | 12/2011 | Brennan | |
| 8,171,593 B2 | 5/2012 | Sprague | |
| 8,209,776 B1 * | 7/2012 | Aragon et al. | A41D 20/00 2/917 |
| 9,775,390 B2 * | 10/2017 | Sheedy | A41D 20/00 |
| 10,214,047 B1 * | 2/2019 | Haggarty | B43M 11/04 |
| 10,322,325 B2 * | 6/2019 | Farina et al. | A63B 57/60 |
| 10,485,285 B2 * | 11/2019 | Dixon | A63B 71/10 |
| 11,197,589 B2 * | 12/2021 | Cheung et al. | A45C 13/1069 |
| 2008/0311166 A1 | 12/2008 | Wimer | |
| 2010/0043163 A1 * | 2/2010 | Kandall | A42B 1/24 15/210.1 |
| 2021/0007559 A1 * | 1/2021 | DiVirgilio et al. | A45D 44/08 |
| 2021/0085003 A1 * | 3/2021 | McCants | A41D 20/00 |
| 2021/0235958 A1 * | 8/2021 | Evans | A47L 13/16 |

* cited by examiner

*Primary Examiner* — Ko H Chan
(74) *Attorney, Agent, or Firm* — Cramer Patent & Design, PLLC; Aaron R. Cramer

(57) ABSTRACT

A pre-moistened absorbent cloth material has opposing portions of leather at each distal end and a mating pair of fasteners. The absorbent cloth material is particularly suited for attachment to a sporting helmet.

6 Claims, 7 Drawing Sheets

PRE-MOISTENED CLOTH

RELATED APPLICATIONS

None.

FIELD OF THE INVENTION

The present invention relates to a pre-moistened cloth and more specifically to a pre-moistened cloth for a sports helmet or hat.

BACKGROUND OF THE INVENTION

The sport of football has remained among the most popular in the recent history of our country. The pure exhilaration of stepping onto a field with your teammates with only one team coming out a winner not only on the basis of physical strength but skill and strategy as well is something that many people cannot resist. One common sight at almost all football games is the quarterback licking his fingers right before receiving the ball from the center.

This action moistens his or her fingers and helps not only with holding the ball but imparting a proper spin when throwing it. While necessary, it is certainly not sanitary. Not only is loose dirt and germs introduced into the quarterback's mouth, but their saliva, and associated bacteria, is imparted to other players who handle the ball after them. Accordingly, there exists a need for a means by which a quarterback's fingers can be moistened for maximum play, but without the use of sticking one's fingers in their mouth. The development of the pre-moistened cloth fulfills this need.

SUMMARY OF THE INVENTION

The principles of the present invention provide for a moistened cloth which comprises a section of absorbent textile, a pair of ends each disposed on each end of the absorbent textile, a pair of grips each disposed on each end of the pair of ends, and a fastener which has a first half and a second half. The first half of the fastener is disposed on a first grip of the pair of grips and the second fastener half is disposed on a second grip of the pair of grips. The moistened cloth is folded over on itself one time and sewn together with stitching along an edge of the moistened cloth.

The absorbent textile may be terrycloth while the pair of grips may be made of leather. The fastener may be a hook and loop fastener, snaps, buttons, ties, or clips. The grips may overlap on each end of the absorbent textile and may be attached via stitching. The folded over dimensions may be two and half inches wide, three-and-a-quarter inches long and one-thirty-second of an inch thick. The moistened cloth moistens the fingertips of a sports player to aid in gripping and throwing a ball.

The ball may be a football or baseball. The moistened cloth may be coupled to a football helmet faceguard. The moistened cloth may be wrapped around a tubular holder. The tubular holder may be provided with a slot that runs along the tubular holder. The absorbent textile may be wrapped around the outer perimeter of the tubular holder and may be routed into the slot where the absorbent textile terminates in the interior of the tubular holder. The moistened cloth may be secured via a friction fit to the bill of a baseball cap.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | moistened cloth |
| 15 | absorbent textile |
| 20 | stitching |
| 25 | grip |
| 30 | fastening system half |
| 35 | fastening system mating half |
| 40 | football helmet |
| 45 | horizontal brace |
| 50 | face mask |
| 55 | fabric tab |
| 60 | football player |
| 65 | longer fabric tab |
| 70 | baseball cap |
| 75 | tubular holder |
| 80 | bill |
| 85 | baseball player |
| 90 | slot |
| 95 | interior |

DESCRIPTION OF THE PREFERRED EMBODIMENTS

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
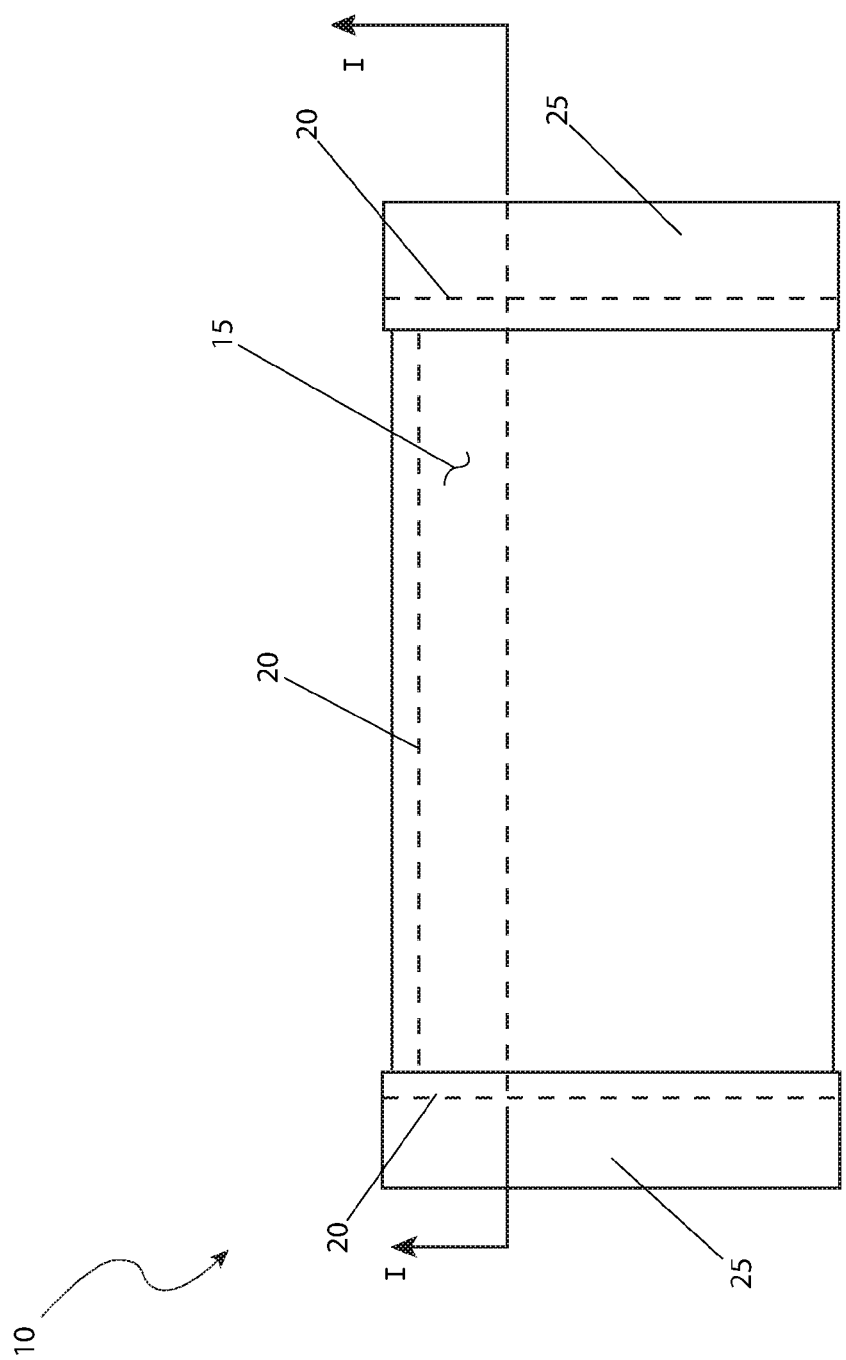
FIG. 1 is a front view of the moistened cloth, according to the preferred embodiment of the present invention.

Referring now to FIG. 1, a front view of the moistened cloth 10, according to the preferred embodiment of the present invention is disclosed. The moistened cloth 10 (herein also described as the "device") 10, provides a device to help moisten the fingertips of a sports player to aid in the gripping and throwing of a ball such as a football or baseball. A section of absorbent textile 15, such as terrycloth, comprises the main portion of the device 10. It is folded over on itself one time and sewn with stitching 20, along one (1) long edge. The folded dimensions are approximately two and half inches (2-½ in.) wide, three-and-a-quarter inches (3-¼ in.) long and one-thirty-second of an inch thick (1/32 in.). Both of the shorter ends are provided with grips 25 envisioned to be made of leather for durability. The grips 25 are attached by stitching 20 as well.

Figure 2:
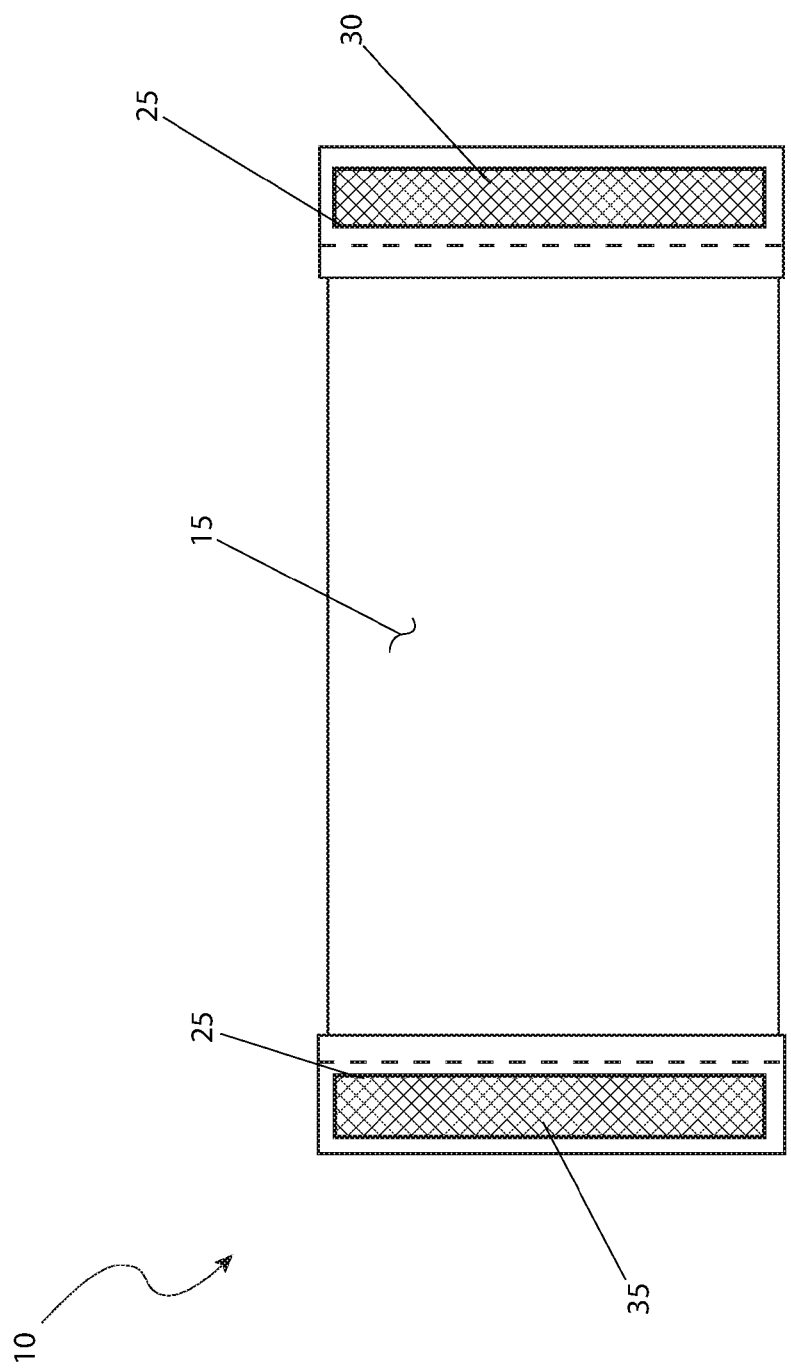
FIG. 2 is a back view of the moistened cloth, according to the preferred embodiment of the present invention.

Referring next to FIG. 2, a back view of the device 10, according to the preferred embodiment of the present invention is depicted. This view is similar to the front with the absorbent textile 15 being the predominant surface and the grips 25 being located on both of the short edges of the absorbent textile 15. One (1) of the grips 25 is provided with a fastening system half 30, herein depicted as the hook portion of a hook-and-loop fastening system, while the remaining grips 25 is provided with a fastening system mating half 35, herein depicted as the loop portion of a hook-and-loop fastening system. This allows the device 10 to be looped back on itself and around various objects for the purposes of attachment when the fastening system half 30 is engaged with the fastening system mating half 35. Those skilled in the art will realize that other types of fastening systems depicted by the fastening system half 30 and the fastening system mating half 35, such as snaps, buttons, ties, clips, and the like, will work equally well in the described application. Thus, the use of any particular type of fastening system half 30 and fastening system mating half 35 is not intended to be a limiting factor of the present invention.

Figure 3:
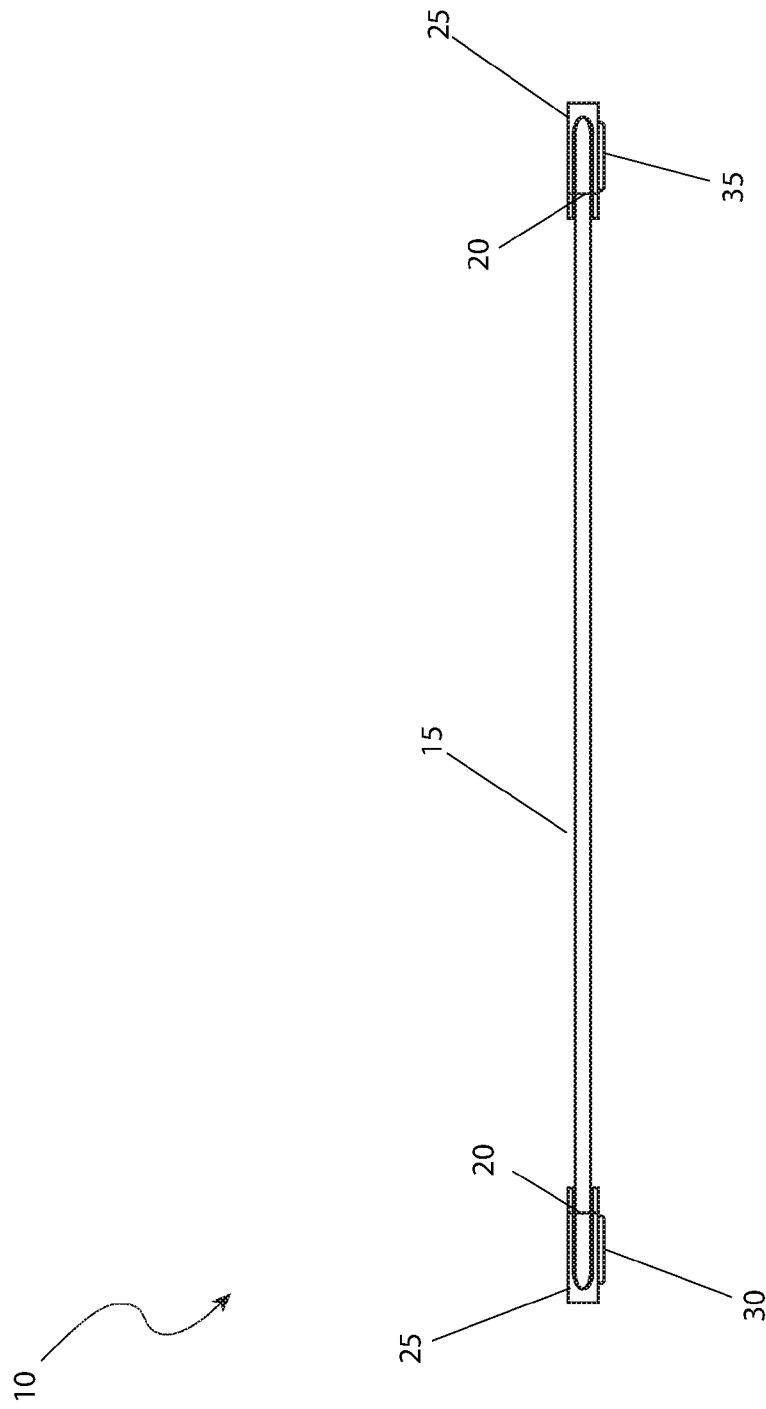
FIG. 3 is a sectional view of the moistened cloth, as seen along a line I - I, as shown in FIG. 1, according to the preferred embodiment of the present invention.

Referring now to FIG. 3, a sectional view of the device 10, as seen along a line I - I, as shown in FIG. 1, according to the preferred embodiment of the present invention is shown. This view provides additional clarification on the dual or folded construction of the absorbent textile 15 in the middle of the invention. The grips 25 overlap on each end of the absorbent textile 15 and are attached via the stitching 20. The fastening system half 30 is attached to one of the grips 25, while the grips 25 is attached to the other grips 25. The exact fastening method utilized to attach the stitching 20 and the fastening system mating half 35 to the grips 25 will vary but is envisioned to include but not be limited to adhesive, stitching, mechanical fastening, or the like.

Figure 4:
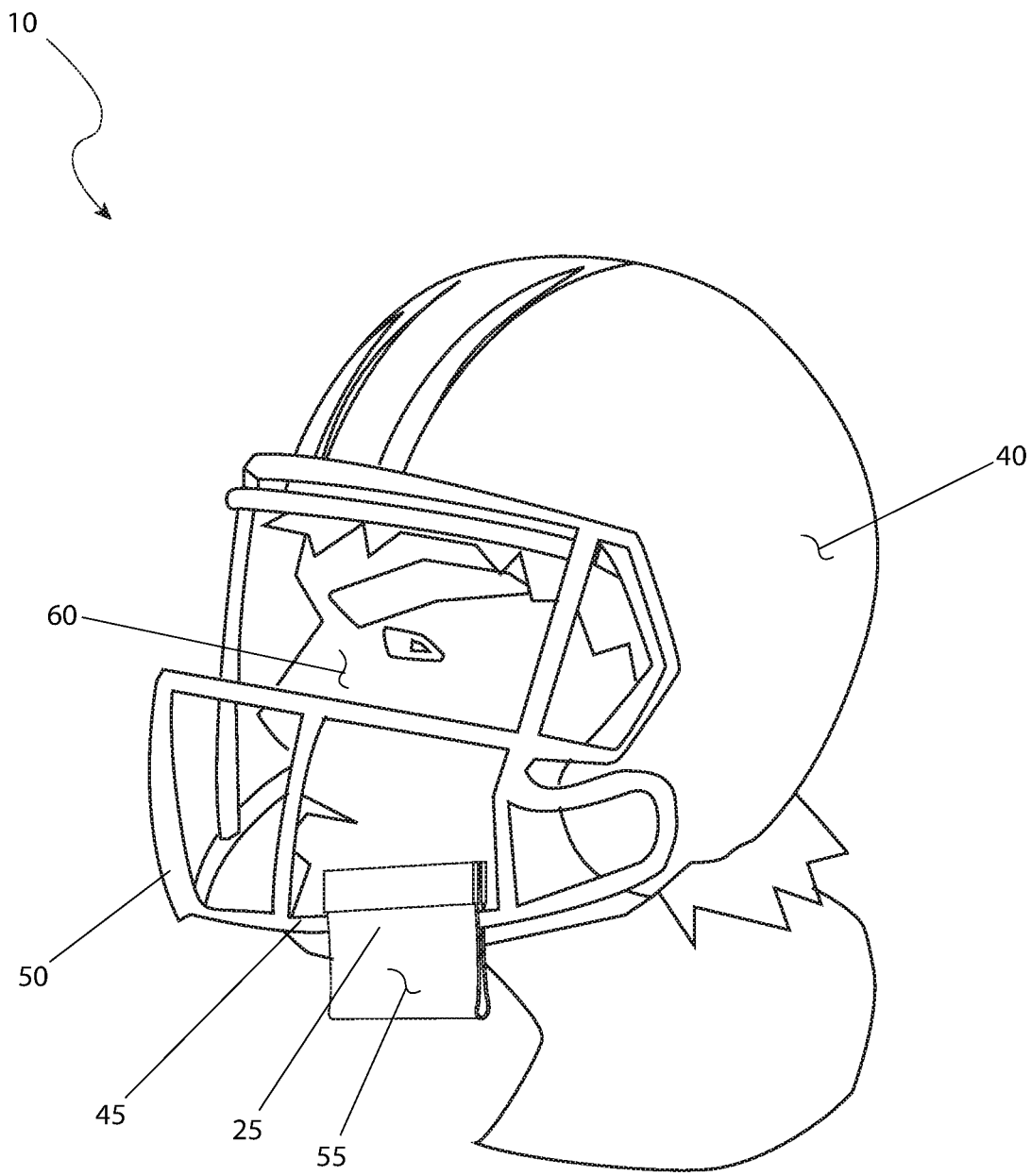
FIG. 4 is a perspective view of the moistened cloth, shown in an installed state on a football helmet, according to the preferred embodiment of the present invention.

Referring next to FIG. 4, a perspective view of the device 10, shown in an installed state on a football helmet 40, according to the preferred embodiment of the present invention is disclosed. The device 10 is looped over a horizontal brace 45 of the face mask 50 where it hangs downward exposing a fabric tab 55 that is readily available to the football player 60. One (1) of the two (2) grips 25 are visible with the hidden grips 25 directly behind. The grips 25 are attached together by the fastening system half 30 (as shown in FIG. 2) and the fastening system mating half 35 (as shown in FIG. 2). While shown on the left side of the football player 60 for purposes of illustration, the cloth 10 would be located on the throwing arm side of the football player 60. Prior to, or immediately after placement on the horizontal brace 45, the absorbent textile 15 (as shown in FIG. 1) would be saturated with water via a water bottle or similar container. During use, immediately before play begins, the football player 60 simply moistens their fingers by running them over the device 10. This action increases the friction between the football and the fingertips of the football player 60, resulting in better ball control, increased throwing distance, and reduced tendency of fumbling. Depending on atmospheric conditions such as temperature, humidity and wind speed, the device 10 would be re-moistened as needed during play. It is also envisioned that other liquids, besides water, could be applied to the absorbent textile 15, such as alcohol, hand sanitizer, and the like, to help avoid the spread of germs, bacteria, and viruses on the surface of the football. The positioning of the device 10 would not interfere with vision of the football player 60 or other factors of play.

Figure 5:
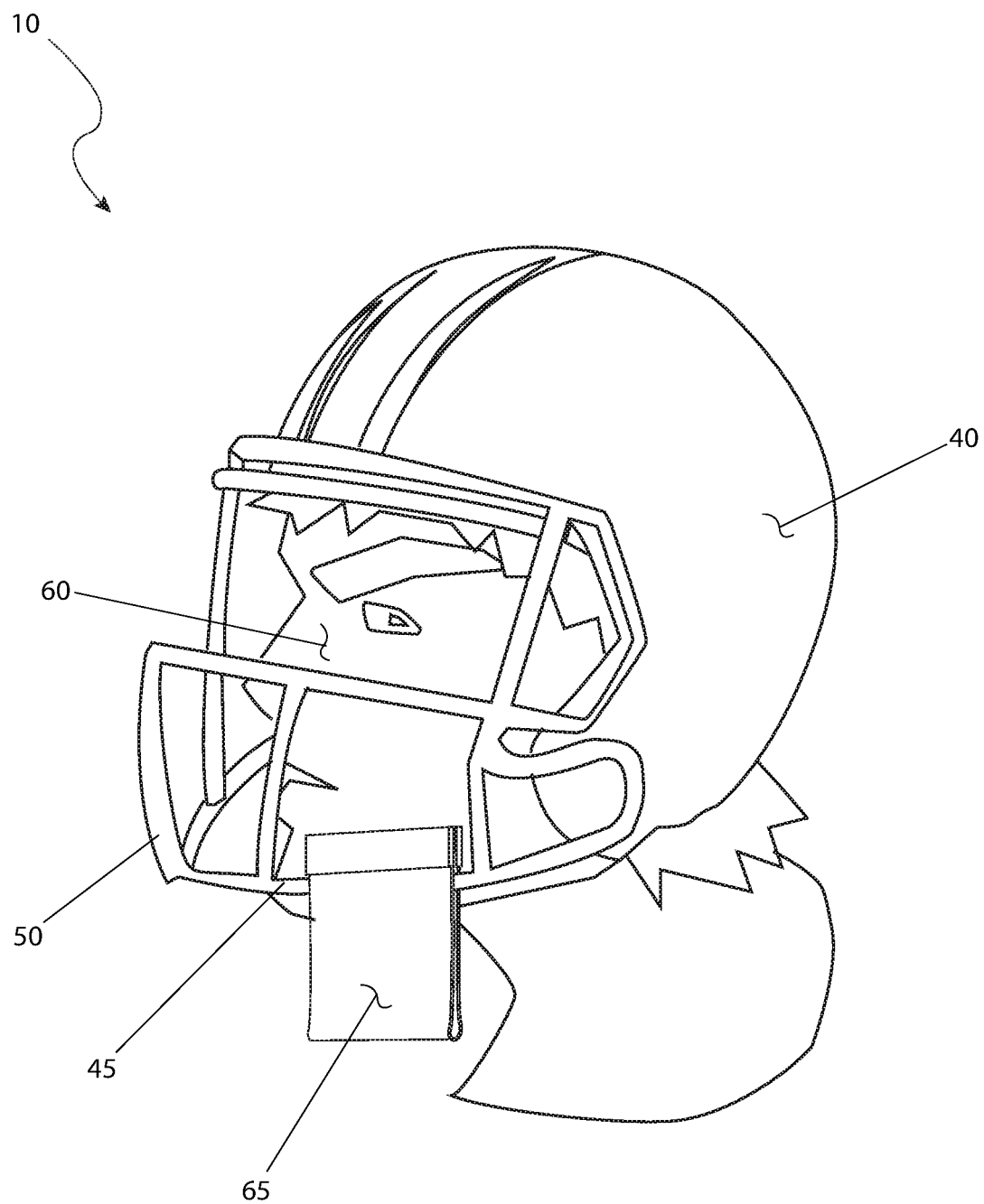
FIG. 5 is perspective view of the moistened cloth, shown in an installed state on a football helmet, according to an alternate embodiment of the present invention.

Referring now to FIG. 5, a perspective view of the device 10, shown in an installed state on a football helmet 40, according to an alternate embodiment of the present invention is depicted. The alternate embodiment provides for a longer section of absorbent textile 15. While the preferred embodiment is approximately three-and-a-quarter inches (3-¼ in.) long, the alternate embodiment is approximately nine-and-a-quarter inches (9-¼ in.) inches or three inches (3 in.) long when folded in half. This produces a longer fabric tab 65. As before, the device 10 hangs from the horizontal brace 45 of the face mask 50 of the football helmet 40. The longer fabric tab 65 would be saturated with water or other liquid prior to usage. It is envisioned that the longer fabric tab 65 of the alternate embodiment would allow a larger area upon which fingertips could be wet, as well as allow for longer periods of time before the longer fabric tab 65 would require re-wetting. As before, the positioning of the device 10 would not interfere with vision of the football player 60 or other factors of play.

Figure 6:
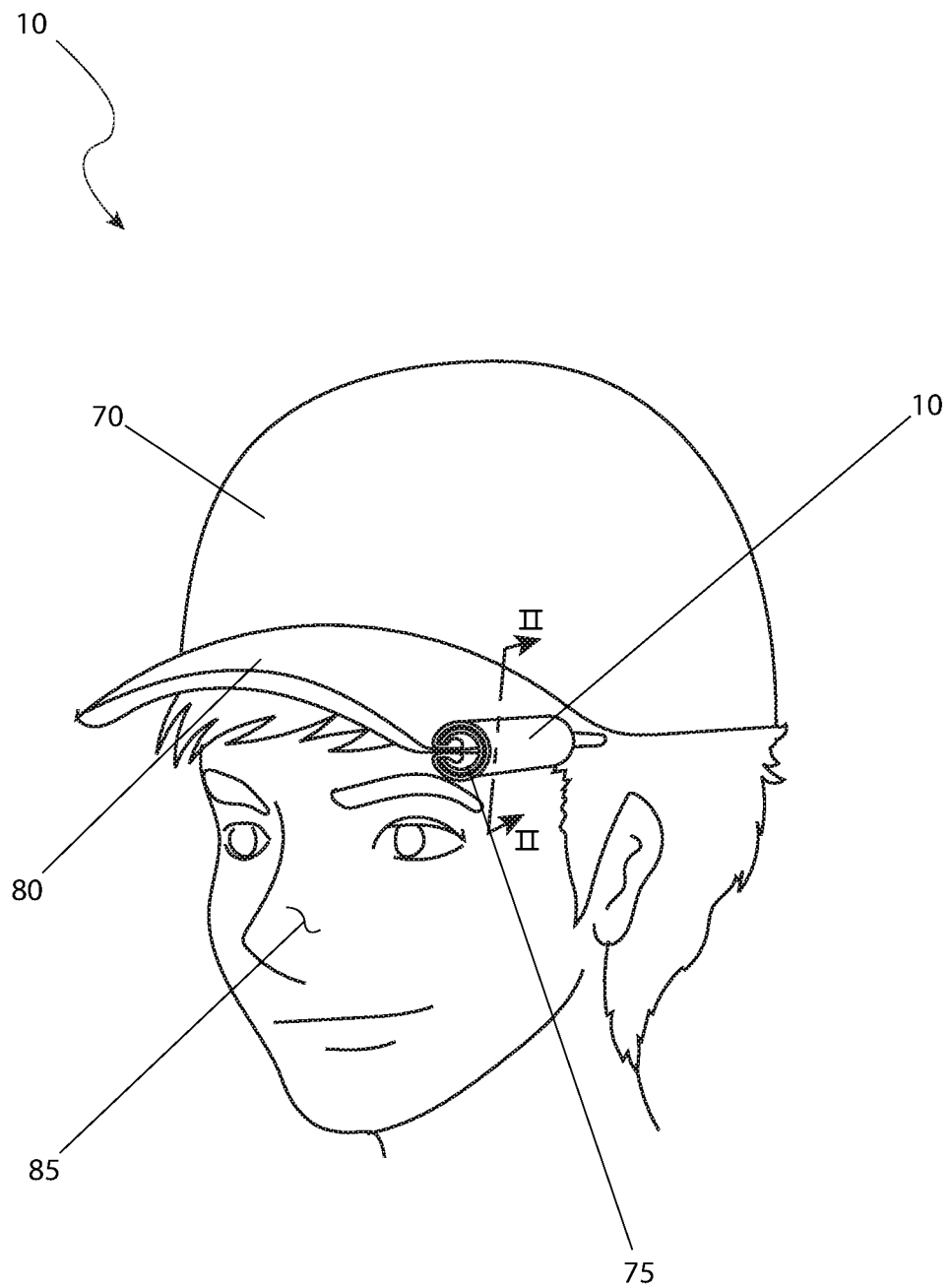
FIG. 6 is a perspective view of the moistened cloth, shown in an installed state on a baseball cap, according to yet another alternate embodiment of the present invention; and, FIG. 7 is a sectional view of the moistened cloth 10, as seen along a line II - II, as shown in in FIG. 6, according to the yet another alternate embodiment of the present invention.

Referring next to FIG. 6, a perspective view of the device 10, shown in an installed state on a baseball cap 70, according to yet another alternate embodiment of the present invention is shown. The device 10 is wrapped around a tubular holder 75 and secured via a friction fit to the bill 80 of the baseball cap 70. The device 10 may be located on either the left (as shown) or right-hand side of the baseball cap 70. It is envisioned that the baseball player 85, such as a pitcher would wipe their fingertips to remove dust and dirt and provide the proper amount of moisture to adequately grip the baseball. Such ability will eliminate the time-honored, but unsanitary process of a baseball player 85 licking their fingertips prior to pitching a ball. It is noted however, that such placement of the device 10 on a baseball cap 70 would allow for other uses such as applying hand sanitizer as well.

Figure 7:
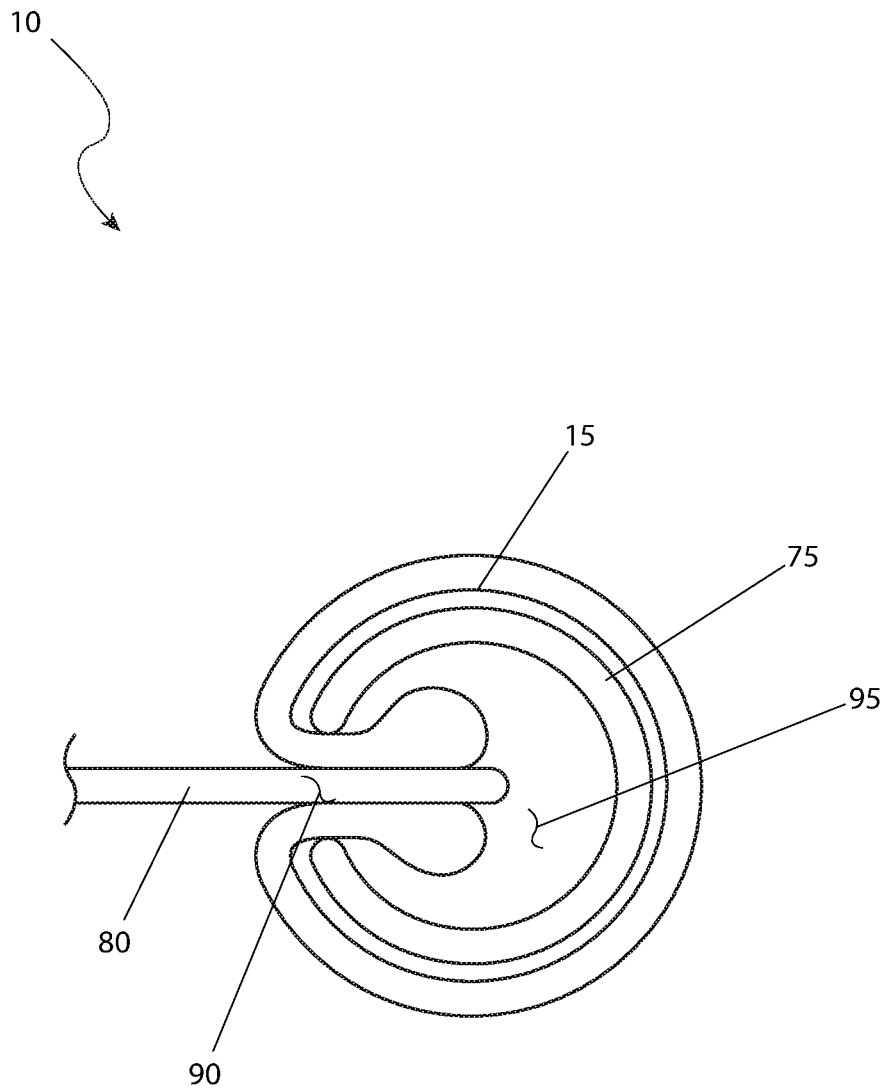

Referring finally to FIG. 7, a sectional view of the device 10, as seen along a line II - II, as shown in in FIG. 6, according to the yet another alternate embodiment of the present invention is disclosed. The tubular holder 75 is provided with a slot 90 that runs the entire length of the tubular holder 75. The absorbent textile 15 is wrapped around the outer perimeter of the tubular holder 75 and is routed into the slot 90 where the absorbent textile 15 terminates in the interior 95 of the tubular holder 75. The bill 80 is inserted in the slot 90 as well where the spring tension of the tubular holder 75 holds the absorbent textile 15 in place via friction fit.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 7. The user would procure the device 10 from conventional procurement channels such as sporting goods stores, discount stores, department stores, mail order and internet supply houses and the like. Special attention would be paid to the overall size of the absorbent textile 15 with regards to the preferred embodiment of FIG. 4 or the extended length of the alternate embodiment of FIG. 5.

After procurement and prior to utilization, the device 10 would be prepared in the following manner: the football player 60 would saturate the absorbent textile 15 with water, hand sanitizer, or other liquid of their preference; the device 10 would then be looped over the horizontal brace 45 on the football helmet 40 on the side of the football helmet 40 that is the same as their throwing hand; in the case of the baseball player 85, the absorbent textile 15 would again be saturated with the liquid of choice; the absorbent textile 15 would then be looped around the tubular holder 75 with the ends of the absorbent textile 15 routed through the slot 90 and placed in the interior 95; the tubular holder 75 would then be slid over the bill 80 on the baseball cap 70 on the same side of the baseball player 85 as is their throwing arm. At this point in time, the absorbent textile 15 is ready for use by either the football player 60 or the baseball player 85.

During utilization of the device 10, the following procedure would be initiated: the football player 60 or baseball player 85 would wipe their fingers and/or hand area on the absorbent textile 15 for the purposes of cleaning their fingertips, and/or imparting moisture on to their fingertips in the case of water or sanitize in the case of hand moisturizer; this process is repeated as necessary throughout the playing session; should the absorbent textile 15 dry out due to evaporation, the absorbent textile 15 is rewetted and the process continues.

After use of the device 10, it is removed from the football helmet 40 or the baseball cap 70, whereupon it can be machine washed and/or rinsed out and allowed to dry before being used again in a repeating and cyclical fashion.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A moistened cloth, comprising:
    a section of absorbent textile;
    a pair of ends each disposed on each end of the absorbent textile;
    a pair of grips each disposed on each end of the pair of ends; and
    a fastener having a first half and a second half, the first half of the fastener is disposed on a first grip of the pair of grips and the second fastener half is disposed on a second grip of the pair of grips;
    wherein the moistened cloth is folded over on itself one time and sewn together with stitching along an edge of the moistened cloth;
    wherein the grips overlap on each end of the absorbent textile and are attached via stitching;
    wherein the moistened cloth is wrapped around a tubular holder;
    wherein the fastener is selected from the group consisting of a set of snaps, a set of buttons, or a set of clips;
    wherein the tubular holder is provided with a slot that runs along the tubular holder;
    wherein the absorbent textile is wrapped around the outer perimeter of the tubular holder and is routed into the slot where the absorbent textile terminates in the interior of the tubular holder; and
    wherein the moistened cloth is secured via a friction fit to the bill of a baseball cap.

2. The moistened cloth, according to claim 1, wherein the absorbent textile is made of terrycloth.

3. The moistened cloth, according to claim 1, wherein the pair of grips are made of leather.

4. The moistened cloth, according to claim 1, wherein the folded over dimensions are two and half inches wide, three-and-a-quarter inches long and one-thirty-second of an inch thick.

5. The moistened cloth, according to claim 1, wherein the moistened cloth moistens the fingertips of a sports player to aid in gripping and throwing a ball.

6. The moistened cloth, according to claim 5, wherein the ball is a baseball.

* * * * *